United States Patent
Depondt et al.

(10) Patent No.: US 9,656,634 B2
(45) Date of Patent: May 23, 2017

(54) WIPER BLADE DEVICE

(71) Applicant: Robert Bosch GmbH, Stuttgart (DE)

(72) Inventors: Helmut Depondt, Boutersem (BE);
 Dirk Herinckx, Dries-Linter (BE);
 Qingyang Liu, Hunan (CN); Koen Bex, Jeuk/Limburg (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/710,576

(22) Filed: May 12, 2015

(65) Prior Publication Data
 US 2015/0329086 A1 Nov. 19, 2015

(30) Foreign Application Priority Data
 May 13, 2014 (DE) .......................... 10 2014 208 972

(51) Int. Cl.
 *B60S 1/38* (2006.01)

(52) U.S. Cl.
 CPC ............. *B60S 1/3877* (2013.01); *B60S 1/381* (2013.01); *B60S 1/3887* (2013.01); *B60S 1/3894* (2013.01); *B60S 1/3881* (2013.01); *B60S 2001/3898* (2013.01); *Y10T 29/49872* (2015.01)

(58) Field of Classification Search
 CPC .... B60S 1/3886; B60S 1/3887; B60S 1/3889; B60S 1/3891; B60S 1/3893; B60S 1/3896; B60S 1/38; B60S 1/3848; B60S 1/381; B60S 1/3881; B60S 1/3894
 USPC .......................... 15/250.43, 250.44, 250.361, 15/250.451–250.454, 250.201
 See application file for complete search history.

(56) References Cited

U.S. PATENT DOCUMENTS

| | | | | |
|---|---|---|---|---|
| 2,782,442 | A * | 2/1957 | Krohm | B60S 1/3801 15/250.452 |
| 2008/0127442 | A1 * | 6/2008 | Jarasson | B60S 1/38 15/250.361 |
| 2014/0047663 | A1 * | 2/2014 | Espinasse | B60S 1/3889 15/250.361 |
| 2014/0090200 | A1 * | 4/2014 | Espinasse | B60S 1/3891 15/250.361 |

FOREIGN PATENT DOCUMENTS

| | | | |
|---|---|---|---|
| DE | 102012215500 | * | 3/2014 |
| EP | 2123524 | * | 11/2009 |
| EP | 2193963 | * | 6/2010 |
| JP | 2005-59644 | * | 3/2005 |

* cited by examiner

*Primary Examiner* — Gary Graham
(74) *Attorney, Agent, or Firm* — Michael Best & Friedrich LLP

(57) ABSTRACT

A wiper blade device with a holding unit (10) which is provided at least for holding a wiper strip (12), and with at least one end cap (14). The holding unit (10) has at least one vertical recess (16) for receiving the end cap (14) in a vertical direction (18).

10 Claims, 6 Drawing Sheets

WIPER BLADE DEVICE

BACKGROUND OF THE INVENTION

A wiper blade device with a holding unit which is provided at least for holding a wiper strip, and with at least one end cap has already been proposed.

SUMMARY OF THE INVENTION

The invention is based on a wiper blade device with a holding unit which is provided at least for holding a wiper strip, and with at least one end cap.

It is proposed that the holding unit has at least one vertical recess for receiving the end cap in a vertical direction. Particularly simple and stable fastening of the end cap to the holding unit can thereby be achieved. In this context, a "holding unit" is intended to be understood as meaning, in particular, a unit which is provided for holding a spring rail, a wiper strip and/or an end cap fixedly to one another. The holding unit preferably has at least one wind deflector element. A "spring rail" is intended to be understood as meaning, in particular, a macroscopic element which has at least one extent which, in a normal operating state, is elastically changeable by at least 10%, in particular by at least 20%, preferably by at least 30% and particularly advantageously by at least 50%, and which in particular produces a counter force which is dependent on a change in the extent and is preferably proportional to the change and opposes the change. The spring rail is preferably at least partially formed from a spring steel. In an unloaded state, the spring rail is preferably substantially in the form of an arcuate rod and particularly advantageously a flattened arcuate rod. Furthermore advantageously, the spring rail is of single-part design. Alternatively, the spring rail can also be of multi-part design. In an unloaded state, a curvature of the spring rail along a longitudinal extent is particularly advantageously greater than a curvature of a vehicle surface of a motor vehicle, in particular a vehicle window, over which the spring rail is guided in at least one operating state. An "extent" of an element is intended to be understood as meaning, in particular, a maximum distance between two points of a vertical projection of the element onto a plane. A "macroscopic element" is intended to be understood as meaning, in particular, an element with an extent of at least 1 mm, in particular of at least 5 mm and preferably of at least 10 mm.

A "wiper strip" is intended to be understood as meaning, in particular, an element composed of an elastic material, with a wiper lip which, for cleaning a surface to be cleaned, in particular a window surface, preferably a vehicle window, is provided to be moved in contact over the surface to be cleaned. The wiper strip is preferably produced from a natural or synthetic elastomer, in particular from rubber. In this context, an "end cap" is intended to be understood as meaning, in particular, a component which is provided to be fastened to one end of a spring rail. The end cap is provided in particular to provide, in a fitted state, an end termination of a wiper blade. The end cap is preferably at least partially formed from a plastic. The end cap preferably engages around part of the spring rail in at least one fitted state. The wiper device preferably comprises precisely two end caps, one for each end of the spring rail. In this context, a "longitudinal direction" is intended to be understood as meaning, in particular, a direction which runs at least substantially parallel to a main longitudinal extent of the wiper strip. In this context, an end cap" is intended to be understood as meaning, in particular, a component which is provided to be fastened to one end of a spring rail. The end cap is in particular provided to provide an end termination of a wiper blade in a fitted state. The end cap is preferably at least partially formed from a plastic. The end cap preferably engages around a part of the spring rail in at least one fitted state. The wiper device preferably comprises precisely two end caps, one for each end of the spring rail. In this context, "at least substantially parallel" is intended to be understood as meaning, in particular, a deviation by less than 20°, preferably by less than 10°, particularly preferably by less than 5°, from a parallel.

In this context, a "wind deflector element" is intended to be understood a meaning, in particular, an element which is provided for deflecting an incident air flow or a relative wind acting on the wiper blade device and/or to be used for bringing about a contact pressure of the wiper strip onto a surface to be wiped. The wind deflector element is preferably at least partially composed of rubber and/or of an at least partially elastic plastic. The wind deflector element preferably has at least one concave incident flow surface. The wind deflector element differs in particular from an end cap, a wiper strip and/or from a wiper blade adapter. In an operating state, the wind deflector element advantageously extends over at least a substantial part of a longitudinal extent of the wiper blade device. The wind deflector element is preferably of single-part design.

In this context, a "vertical recess" is intended to be understood as meaning, in particular, a recess which penetrates at least one element in at least one vertical direction at least to a substantial part and preferably completely. In this context, a "vertical direction" is intended to be understood as meaning, in particular, a direction which runs at least substantially perpendicularly to a surface to be wiped by the wiper strip. The vertical direction preferably runs perpendicularly to a wiping direction. Furthermore advantageously, the vertical direction runs perpendicularly to a longitudinal direction of the wiper strip. In this context, "at least to a substantial part" is intended to be understood as meaning, in particular, to more than 50%, preferably more than 80%, particularly preferably more than 95%. "Provided" is intended to be understood as meaning, in particular, specially designed and/or equipped. The provision of an object for a specific function is intended to be understood as meaning, in particular, that the object carries out and/or executes this specific function in at least one use and/or operating state.

In a further refinement of the invention, it is proposed that the wiper blade device comprises a spring rail channel which is at least partially intersected by the vertical recess. As a result, the at least one end cap can advantageously be locked in a vertical direction by a spring rail. In an advantageous manner, the vertical recess opens the spring rail channel in a wiping direction. In this context, a "spring rail channel" is intended to be understood as meaning, in particular, a channel which is provided for receiving a spring rail and, in a main direction of extent, extends at least substantially parallel to a longitudinal direction of the wiper strip. The spring rail channel advantageously has a closed contour in at least one plane.

Furthermore, it is proposed that the spring rail channel is formed to a substantial part by the wiper strip. As a result, the spring rail can be particularly advantageously protected from weathering influences.

Furthermore, it is proposed that the spring rail channel is at least partially formed by the at least one end cap. As a result, the end cap can be locked by the spring rail in the vertical direction in a structurally simple manner and with little variety of parts.

Furthermore, it is proposed that the wiper blade device comprises the wiper strip which has at least one head strip recess which is provided for the coupling with the end cap. Particularly secure mounting of the end cap with the wiper strip can thereby be achieved. In this context, a "head strip recess" is intended to be understood as meaning, in particular, a recess which is arranged within a head strip. The head strip recess preferably penetrates the head strip completely, at least in regions, in the vertical direction. In this context, a "head strip" is intended to be understood as meaning, in particular, a part of a wiper strip that bears directly against a holding unit. The head strip is preferably formed integrally with the wiper strip. Furthermore preferably, the head strip is produced in an extrusion process. In this context, "integrally" is intended to be understood as meaning, in particular, at least integrally bonded, for example by means of a welding process, an adhesive bonding process, an injection molding process and/or another process appearing expedient to a person skilled in the art, and/or advantageously formed in one piece, such as, for example, by production from a cast part and/or advantageously by production in a single- or multi-component injection molding process.

Furthermore, it is proposed that the head strip recess and the vertical recess are arranged one behind the other in the vertical direction and are provided for receiving the end cap. The end cap can thereby be fitted particularly rapidly on the wiper strip.

Furthermore, it is proposed that the at least one end cap is held in a fitted state in the vertical direction by a spring rail. As a result, further components for fixing the end cap in the vertical direction can advantageously be avoided.

Furthermore, it is proposed that the at least one end cap is held in a fitted state in a longitudinal direction by the holding unit. As a result, further components for fixing the end cap in the longitudinal direction can advantageously be avoided. Furthermore, an end cap of a wiper blade device is proposed.

Furthermore, a method for fastening an end cap to a holding unit of a wiper blade device is proposed, wherein the end cap is placed onto the holding unit in a vertical direction and is fixed in the vertical direction by a spring rail. As a result, the end cap can be connected to the holding unit in a particularly rapid and stable manner.

The wiper blade device according to the invention is not intended to be restricted here to the above-described use and embodiment. In particular, the wiper blade device according to the invention for carrying out a herein described manner for operation can have a number of individual elements, components and units differing from a number mentioned herein.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

FIGS. 1 to 4 show a wiper blade device with a holding unit 10, a wiper strip 12 and an end cap 14. The wiper blade device is provided for cleaning a vehicle window (not illustrated specifically) of a motor vehicle. The wiper blade device is designed as a flat wiper blade device. In a fitted state, the end cap 14 terminates the wiper strip 12 and the holding unit 10 in a longitudinal direction 26. A further end cap (not illustrated) terminates the wiper strip 12 and the holding unit 10 at an opposite end in the longitudinal direction 26.

Figure 1:
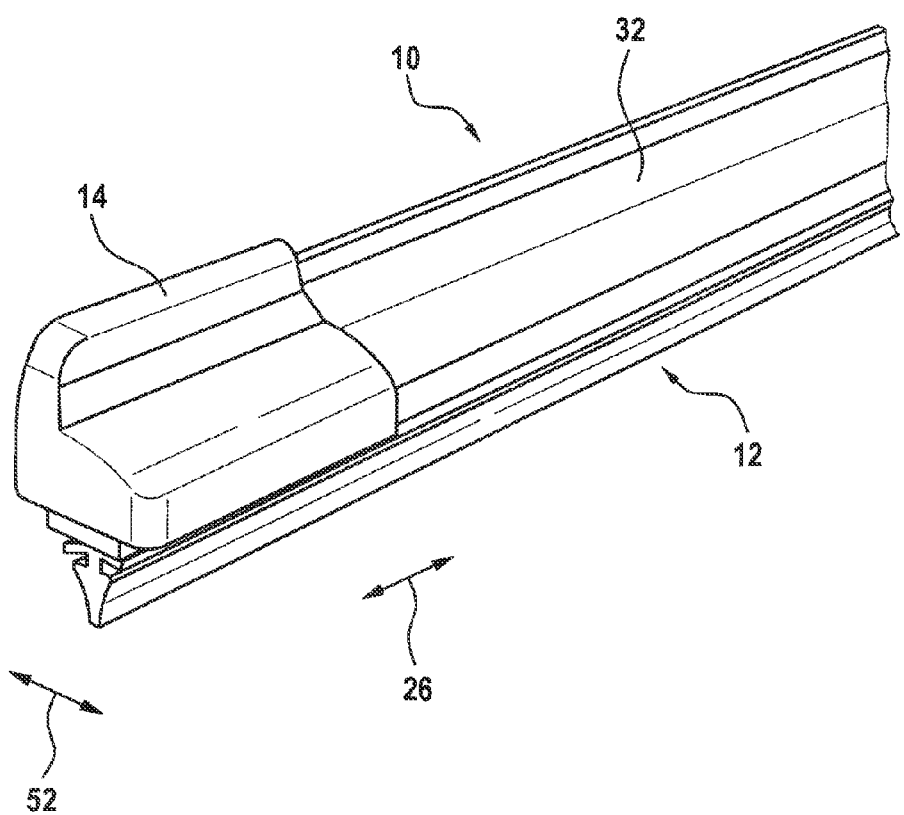
FIG. 1 shows a perspective view of a wiper blade device.
Figure 2:
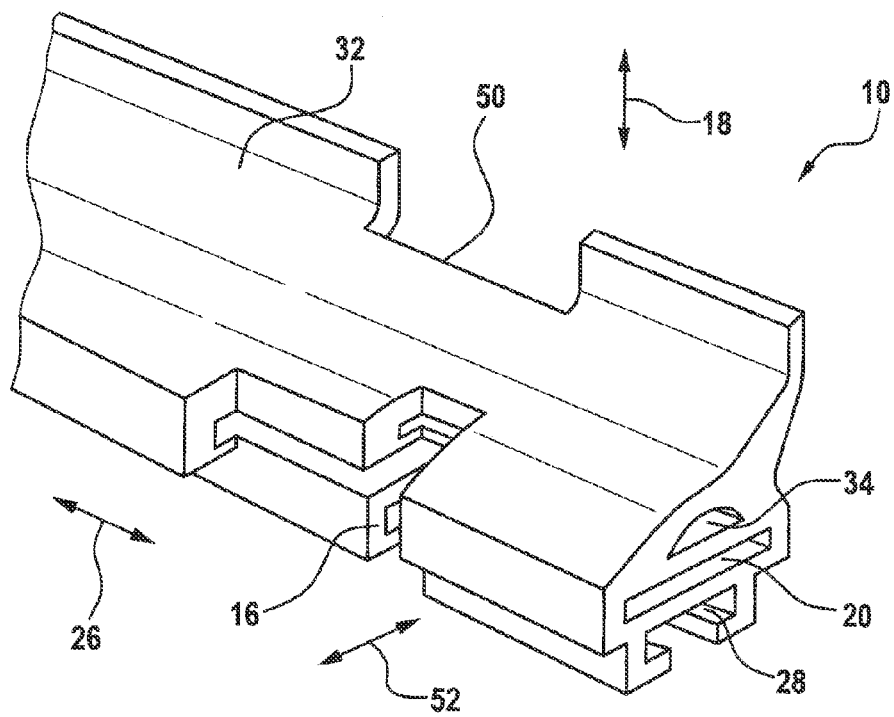
FIG. 2 shows a perspective view of a holding unit of the wiper blade device.

The holding unit 10 is provided for holding the wiper strip 12. For this purpose, the holding unit 10 has a slotted longitudinal channel 28 (FIG. 2). The wiper strip 12 can be introduced into the longitudinal channel 28 in the longitudinal direction 26. In a fitted state, the wiper strip 12 is partially arranged within the longitudinal channel 28. The holding unit 10 furthermore has a closed spring rail channel 20. The spring rail channel 20 is provided for receiving a spring rail 24 of the wiper blade device. The spring rail channel 20 has a rectangular cross section. The holding unit 10 has a wind deflector element 32. The wind deflector element 32 is provided for deflecting relative wind and for producing a contact pressure on the wiper strip 12 in the direction of the vehicle window. The wind deflector element 32 has a wind deflector longitudinal channel 34. In a main direction of extent, the wind deflector longitudinal channel 34 runs parallel to the longitudinal direction 26. The wind deflector longitudinal channel 34 has an at least substantially triangular cross section.

The holding unit 10 has a first vertical recess 16 and a second vertical recess 50 for receiving the end cap 14 in a vertical direction 18. The first vertical recess 16 has an L-shaped cross section. The second vertical recess 50 has a rectangular cross section. The spring rail channel 20 is intersected by the first vertical recess 16. Furthermore, the spring rail channel 20 is intersected by the second vertical recess 50. The spring rail channel 20 is therefore open toward a wiping direction 52 in the region of the vertical recess 16.

Figure 3:
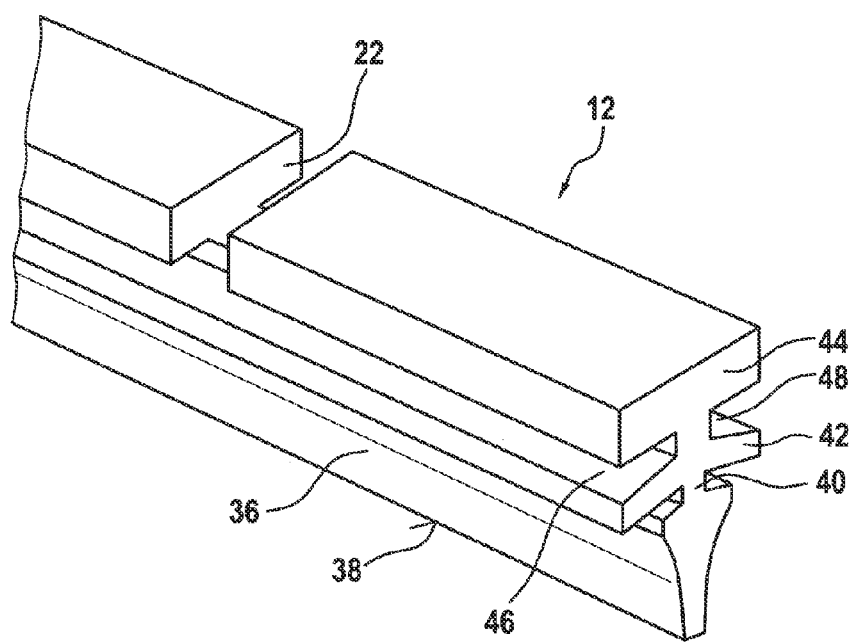
FIG. 3 shows a perspective view of a wiper strip of the wiper blade device.

FIG. 3 illustrates the wiper strip 12. The wiper strip 12 is produced from rubber. The wiper strip 12 has a wiper lip 36. The wiper lip 36 has a wiping edge 38. The wiping edge 38 is provided to be moved in contact over the vehicle window. The wiper strip 12 has a tilting web 40 and a brushing strip 42. The wiper lip 36 is connected to the brushing strip 42 via the tilting web 40. The tilting web 40 supports the wiper lip 36 pivotably relative to the brushing strip 42.

The wiper strip 12 furthermore has a head strip 44. The head strip 44 has two longitudinal grooves 46, 48 for the coupling with the holding unit 10. In the fitted state, the holding unit 10 engages in the longitudinal grooves 46, 48 of the head strip 44. The wiper lip 36, the tilting web 40, the brushing strip 42 and the head strip 44 are formed integrally with one another. The wiper strip 12 is produced in an extrusion process. The head strip 44 of the wiper strip 12 has a head strip recess 22. The head strip recess 22 is provided for the coupling with the end cap 14. The head strip recess 22 completely penetrates the head strip 44 in regions in the vertical direction 18.

Figure 4:
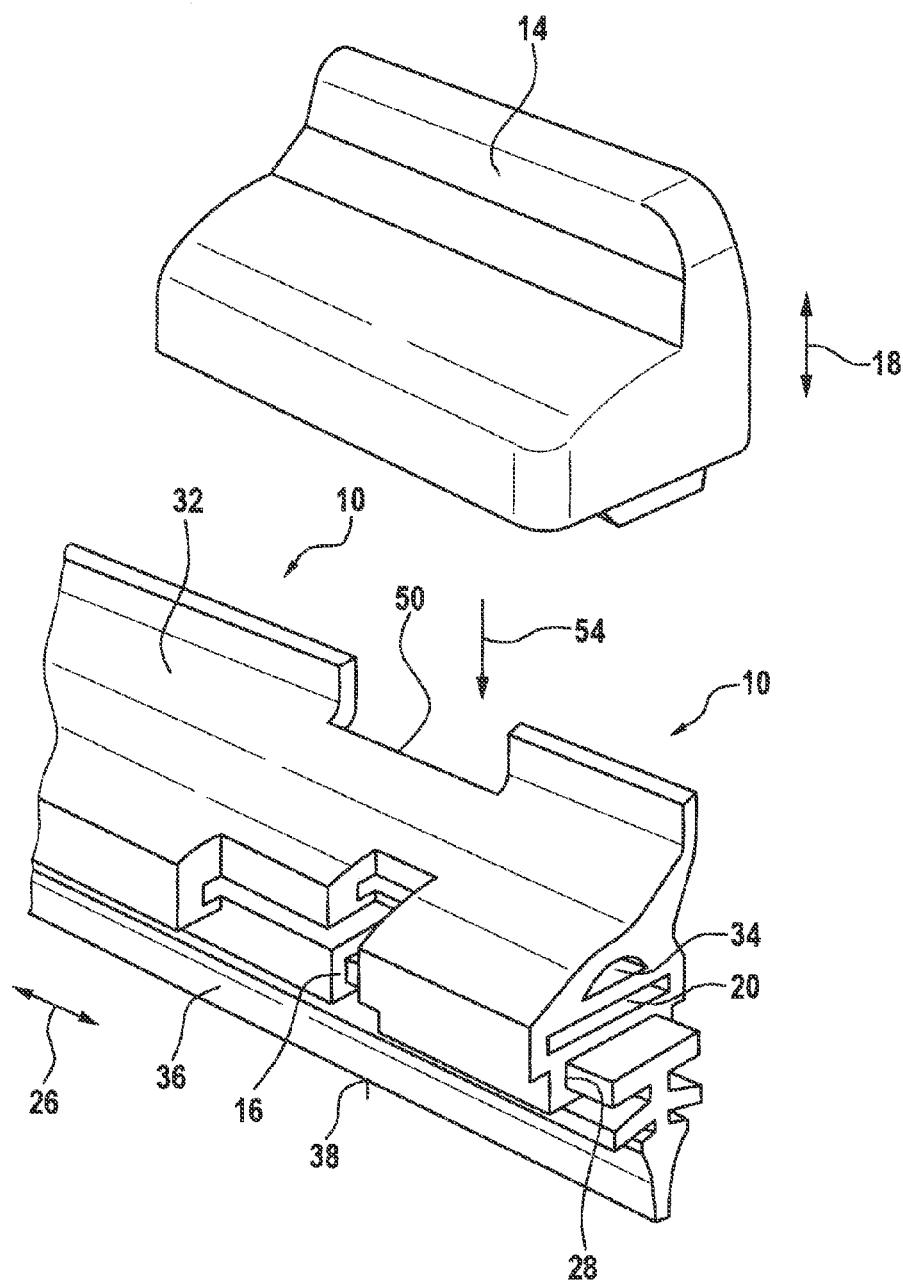
FIG. 4 shows a perspective view of the wiper blade device before the latter is mounted.

FIG. 4 shows a first mounting step for mounting the wiper blade device. The wiper strip 12 is coupled to the holding unit 10. The wiper strip 12 is pushed here into the longitudinal channel 28 to an extent such that the head strip recess 22 and the vertical recess 16 are arranged one behind the other in the vertical direction 18. The head strip recess 22 and the vertical recess 16 are provided for receiving the end cap 14. The end cap 14 is placed onto the holding unit 10 in a mounting direction 54. In the process, the end cap 14 partially engages in the head strip recess 22 and the vertical recess 16. The mounting direction 54 runs parallel to the vertical direction 18. It is also conceivable in this connection for the mounting direction 54 to run at an acute angle to the vertical direction 18. After the end cap 14 has been placed onto the holding unit 10, a movement of the end cap 14 in the longitudinal direction 26 relative to the holding unit 10 is blocked. In other words, in the fitted state, the end cap 14 is held in the longitudinal direction 26 by the holding unit 10. The end cap 14 is also blocked in the wiping direction 52 relative to the holding unit 10.

Figure 5:
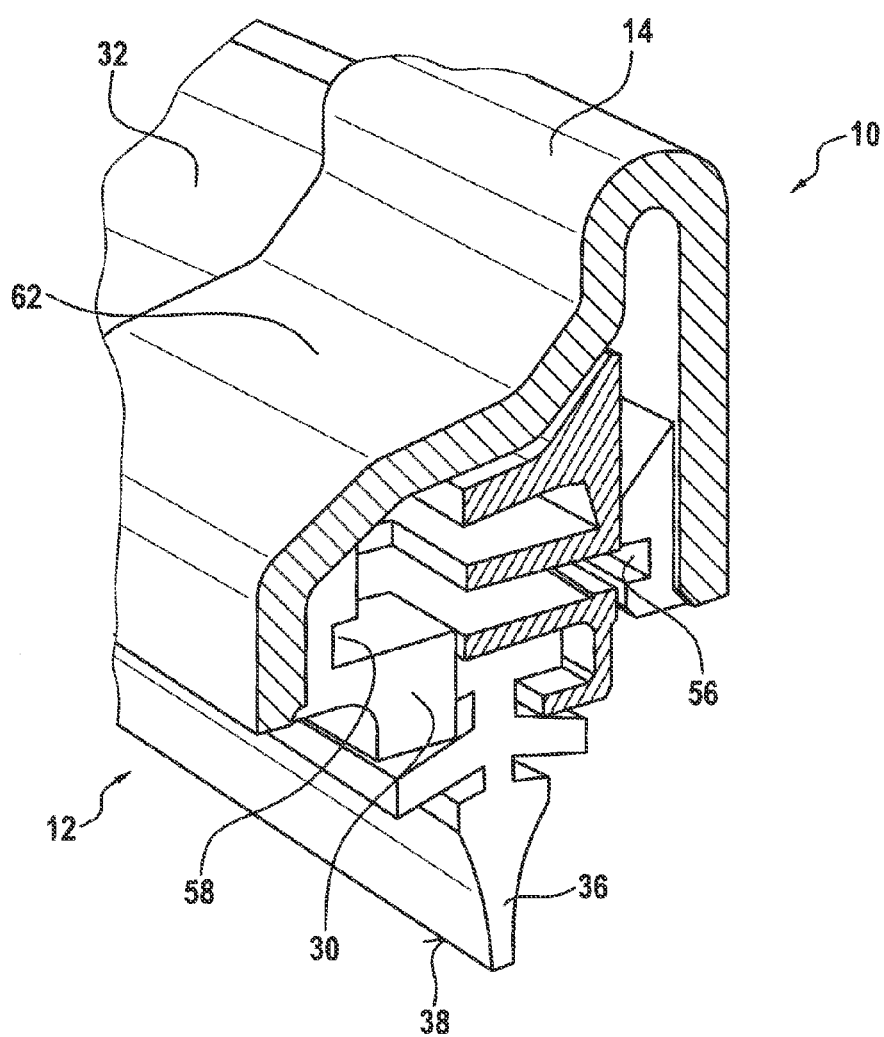
FIG. 5 shows a partial sectional illustration of the wiper blade device.

The spring rail channel 20 is formed to a substantial part by the wiper strip 12. However, as FIG. 5 shows, the spring rail channel 20 is partially formed by the end cap 14. For this purpose, the end cap 14 has lateral longitudinal grooves 56, 58 for receiving the spring rail 24. In a fitted state, the spring rail 24 bears in the longitudinal grooves 56, 58 against the end cap 14. The end cap 14 is free from latching means. The end cap 14 has a wing deflector element 62 for deflecting an incident air flow acting on the wiper blade device.

Figure 6:
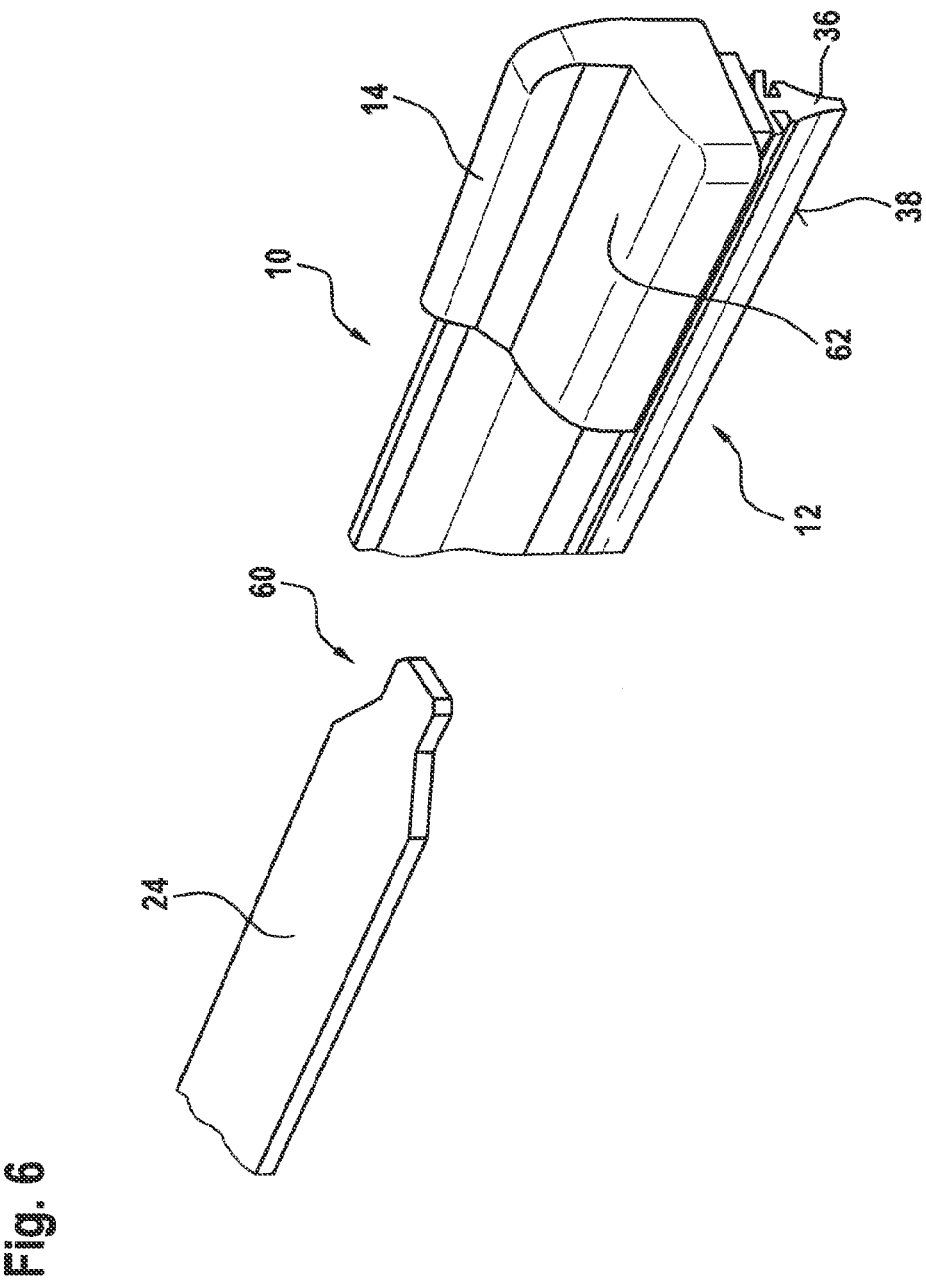
FIG. 6 shows a perspective view of the wiper blade device in a mounting step.

As FIG. 6 shows, the spring rail 24 is pushed into the spring rail channel 20 in a further mounting step. The spring rail 24 is formed from spring steel. The spring rail 24 has an elongate, flattened shape. At a free end 60, the spring rail 24 has a tapered portion. The tapered portion is provided as an insertion aid. The spring rail 24 is of single-part design. However, it is also conceivable in this context for the spring rail 24 to be of multi-part design, in particular consisting of two spring rail parts running next to each other. The spring rail 24 engages in the region of the vertical recess 16, 50 in the longitudinal grooves 56, 58 of the end cap 14. The end cap 14 furthermore has a pedestal-like base element 30 which is provided for contact with the spring rail 24. In a fitted state, the base element 30 bears in the vertical direction 18 against the spring rail 24. The base element 30 bears here against a side of the spring rail 24 that faces the wiper lip.

The end cap 14 is therefore held in a fitted state in the vertical direction 18 by the spring rail 24. The spring rail 24 is blocked in the longitudinal direction 26 relative to the holding unit 10 in a manner known to a person skilled in the art. For this purpose, the spring rail 24 can be held in position, for example, by a wiper blade adapter (not illustrated).

What is claimed is:

1. A wiper blade device comprising a holding unit (10) holding a wiper strip (12), and also comprising at least one end cap (14), wherein the holding unit (10) has at least one vertical recess (16) receiving the end cap (14) in a vertical direction (18), wherein the holding unit (10) further includes a spring rail channel (20) which is at least partially intersected by the at least one vertical recess (16), wherein the end cap (14) includes a lateral longitudinal groove (56, 58), and wherein the spring rail channel (20) and the lateral longitudinal groove (56, 58) are aligned to form a channel configured to receive and hold a spring rail (24), wherein the at least one end cap (14) is held in a fitted state in the vertical direction (18) by the spring rail (24).

2. The wiper blade device according to claim 1, wherein the spring rail channel (20) is formed to a substantial part by the wiper strip (12).

3. The wiper blade device according to claim 1, wherein the wiper strip (12) has at least one head strip recess (22) coupling with the end cap (14).

4. The wiper blade device according to claim 3, wherein the head strip recess (22) and the vertical recess (16) are arranged one behind the other in the vertical direction (18) and receive the end cap (14).

5. The wiper blade device according to claim 1, wherein the at least one end cap (14) is held in a fitted state in a longitudinal direction (26) by the holding unit (10).

6. The wiper blade device according to claim 1, wherein the at least one vertical recess (16) includes a vertical recess (16) that projects laterally into the holding unit (10) along a wiping direction (52).

7. The wiper blade device according to claim 1, wherein the at least one vertical recess (16) includes a first vertical recess (16) and a second vertical recess (50).

8. The wiper blade device according to claim 1, wherein the vertical direction (18) is perpendicular to a wiping direction (52) of the wiper blade device.

9. A wiper blade device comprising a holding unit (10) holding a wiper strip (12), and also comprising at least one end cap (14), wherein the holding unit (10) has at least one vertical recess (16) receiving the end cap (14) in a vertical direction (18), wherein the holding unit (10) further includes a spring rail channel (20) which is at least partially intersected by the at least one vertical recess (16), wherein the end cap (14) includes a lateral longitudinal groove (56, 58), and wherein the spring rail channel (20) and the lateral longitudinal groove (56, 58) are aligned to form a channel configured to receive and hold a spring rail (24), wherein the end cap (14) includes two lateral longitudinal grooves (56, 58), wherein one of the lateral longitudinal grooves (56) is aligned with the spring rail channel (20) along a first side of the spring rail channel (20), and wherein the other lateral longitudinal groove (56) is aligned with the spring rail channel (20) along a second, opposite side of the spring rail channel (20), and wherein the end cap (14) is fixed in the vertical direction (18) by the spring rail (24).

10. A wiper blade device comprising a holding unit (10) holding a wiper strip (12), and also comprising at least one end cap (14), wherein the holding unit (10) has at least one vertical recess (16) receiving the end cap (14) in a vertical direction (18), wherein the end cap (14) and the holding unit (10) together define a channel after the end cap (14) has been received, and wherein the wiper blade device further comprises a spring rail (24) that is configured to be pushed through the channel after the end cap (14) has been received, wherein the end cap (14) includes a first surface and the holding unit (10) includes a second surface, wherein the first and second surfaces are co-planar and define a lower boundary of the channel, and wherein the spring rail (24) rests on the lower boundary.

* * * * *